(12) United States Patent
Chirde (10) Patent No.: US 9,183,813 B2
(45) Date of Patent: Nov. 10, 2015

(54) CUSTOMIZED CROPPING OF A DISPLAY SCREEN AREA OF A DISPLAY UNIT OF A DATA PROCESSING DEVICE

(71) Applicant: NVIDIA Corporation, Santa Clara, CA (US)

(72) Inventor: Rupesh Deorao Chirde, Yavatmal (IN)

(73) Assignee: NVIDIA Corporation, Santa Clara, CA (US)

( * ) Notice: Subject to any disclaimer, the term of this patent is extended or adjusted under 35 U.S.C. 154(b) by 216 days.

(21) Appl. No.: 13/732,451

(22) Filed: Jan. 2, 2013

(65) Prior Publication Data

US 2014/0184637 A1    Jul. 3, 2014

(51) Int. Cl.
*G09G 5/00* (2006.01)
*G09G 5/30* (2006.01)

(52) U.S. Cl.
CPC ........................................ *G09G 5/30* (2013.01)

(58) Field of Classification Search
None
See application file for complete search history.

(56) References Cited

U.S. PATENT DOCUMENTS

| | | |
|---|---|---|
| 2002/0126142 A1 | 9/2002 | Hodgkinson |
| 2005/0172082 A1 | 8/2005 | Liu et al. |
| 2005/0195221 A1* | 9/2005 | Berger et al. ................. 345/660 |
| 2007/0139425 A1 | 6/2007 | Neuman |
| 2007/0258012 A1 | 11/2007 | Miller |
| 2011/0044662 A1 | 2/2011 | Gandolph et al. |

FOREIGN PATENT DOCUMENTS

| | | |
|---|---|---|
| TW | I222018 B | 10/2004 |
| TW | I222572 B | 10/2004 |

OTHER PUBLICATIONS

Office Action from Taiwan Patent Application No. 102133391, dated Jan. 23, 2015.

* cited by examiner

*Primary Examiner* — Edward Martello (74) *Attorney, Agent, or Firm* — Zilka-Kotab, PC (57) ABSTRACT

A method includes triggering, through an interface of a data processing device, cropping of a display screen area of a display unit of the data processing device. The method also includes initiating, through a driver component associated a processor of the data processing device, an operating system executing on the data processing device and/or an application executing on the data processing device, the processor to process pixel data to be displayed on the display screen area based on the triggering. Further, the method includes rendering, through the processor, the processed pixel data on a cropped portion of the display screen area of the display unit.

20 Claims, 8 Drawing Sheets

CUSTOMIZED CROPPING OF A DISPLAY SCREEN AREA OF A DISPLAY UNIT OF A DATA PROCESSING DEVICE

FIELD OF TECHNOLOGY

This disclosure relates generally to data processing devices and, more particularly, to a method, a device and/or a system of customized cropping of a display screen area of a display unit of a data processing device.

BACKGROUND

A data processing device (e.g., a desktop computer, a laptop computer, a notebook computer, a netbook, a mobile device such as a mobile phone) may have a display unit associated therewith. The display unit may be illuminated by a backlight of the data processing device. The display unit may be a component of the data processing device consuming maximum power from a battery thereof. In the case of the data processing device being a mobile phone, a user of the mobile phone may most frequently check a current time displayed on the display unit and/or a remaining battery time without performing any other action on the data processing device. By default, an entire display screen area of the display unit may be illuminated by the backlight, thereby consuming a lot of power from the battery.

SUMMARY

Disclosed are a method, a device and/or a system of customized cropping of a display screen area of a display unit of a data processing device.

In one aspect, a method includes triggering, through an interface of a data processing device, cropping of a display screen area of a display unit of the data processing device. The method also includes initiating, through a driver component associated a processor of the data processing device, an operating system executing on the data processing device and/or an application executing on the data processing device, the processor to process pixel data to be displayed on the display screen area based on the triggering. Further, the method includes rendering, through the processor, the processed pixel data on a cropped portion of the display screen area of the display unit.

In another aspect, a non-transitory medium, readable through a data processing device and including instructions embodied therein that are executable through the data processing device, is disclosed. The non-transitory medium includes instructions to enable triggering, through an interface of the data processing device, cropping of a display screen area of a display unit of the data processing device. The non-transitory medium also includes instructions to initiate, through a driver component associated with a processor of the data processing device, an operating system executing on the data processing device and/or an application executing on the data processing device, the processor to process pixel data to be displayed on the display screen area based on the triggering. Further, the non-transitory medium includes instructions to render, through the processor, the processed pixel data on a cropped portion of the display screen area of the display unit.

In yet another aspect, a data processing device includes a memory, a processor communicatively coupled to the memory, a display unit, an interface to enable triggering of cropping of a display screen area of the display unit, and a driver component associated with the processor, an operating system executing on the data processing device and/or an application executing on the data processing device. The driver component is configured to initiate the processor to process pixel data to be displayed on the display screen area based on the triggering through the interface. The processor is further configured to render the processed pixel data on a cropped portion of the display screen area of the display unit.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device of customized cropping of a display screen area of a display unit of a data processing device. Although the present embodiments have been described with reference to specific example embodiments, it will be evident that various modifications and changes may be made to these embodiments without departing from the broader spirit and scope of the various embodiments.

Figure 1:
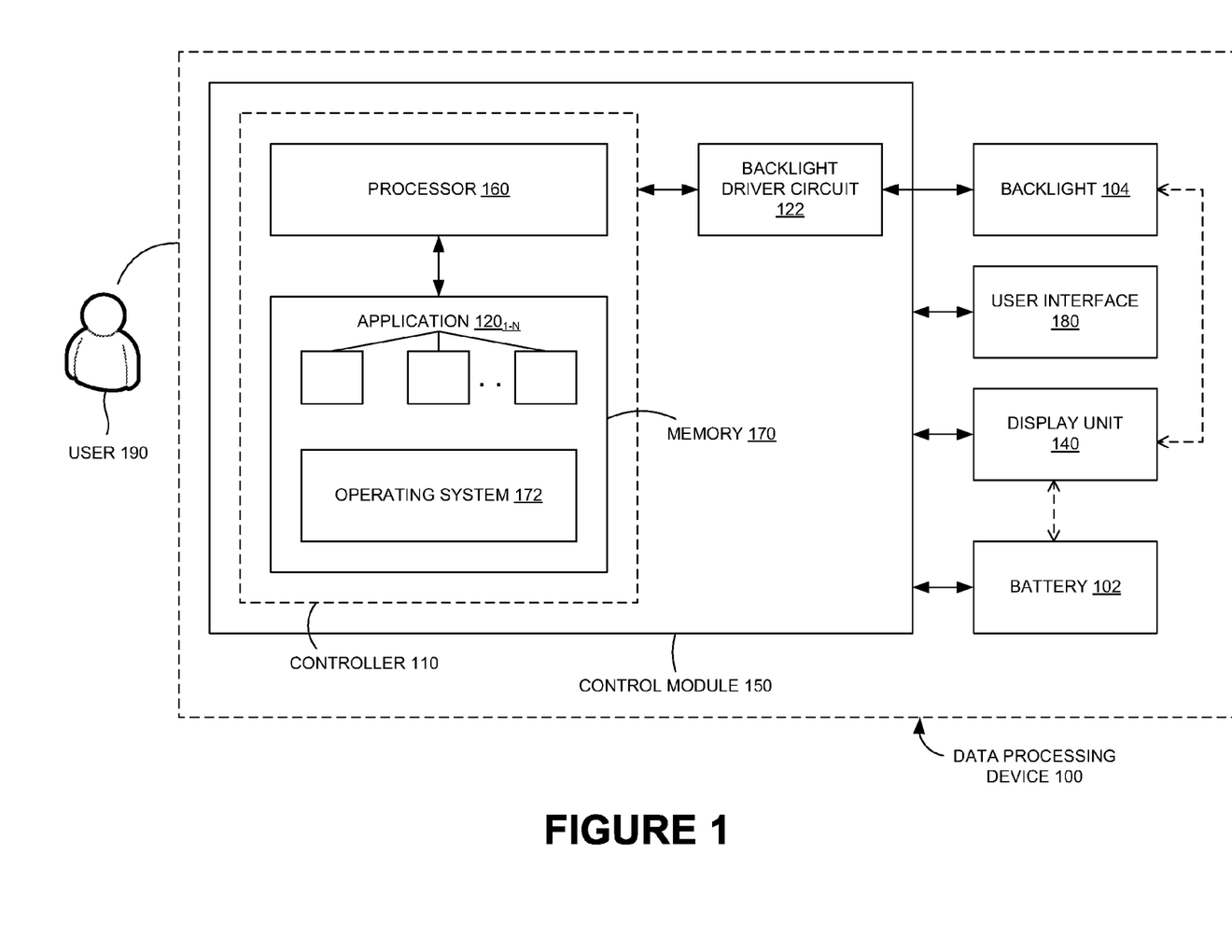
FIG. 1 is a schematic view of a data processing device, according to one or more embodiments.

FIG. 1 shows a block diagram of a data processing device 100, according to one or more embodiments. In one or more embodiments, data processing device 100 may be a desktop computer, a laptop computer, a notebook computer, a netbook or a mobile device such as a mobile phone. Other forms of data processing device 100 are within the scope of the exemplary embodiments discussed herein. In one or more embodiments, data processing device 100 may include a controller 110 configured to control functionalities associated therewith. In one or more embodiments, controller 110 may include a processor 160 (e.g., a Central Processing Unit (CPU), a Graphics Processing Unit (GPU)) communicatively coupled to a memory 170 (e.g., a volatile memory and/or a non-volatile memory); memory 170 may include storage locations configured to be addressable through processor 160.

In one or more embodiments, an operating system 172 may execute on data processing device 100; FIG. 1 shows operating system 172 as being stored in memory 170. FIG. 1 shows controller 110 as being configured to manage backlight driver circuit 122 that is configured to switch on/off backlight 104 based on a control signal from controller 110. Also, controller 110 is shown along with backlight driver circuit 122 as being part of a control module 150 configured to control backlight 104 (e.g., a Light Emitting Diode (LED)). In one or more embodiments, control module 150 may be a dedicated integrated circuit that is programmable.

In one or more embodiments, as data processing device 100 may be configured to derive power from a battery 102, battery 102 is shown as being interfaced with control module 150. It is obvious that control module 150 may include other elements necessary for the functioning of data processing device 100 but not relevant to the concepts associated with the exemplary embodiments discussed herein. Therefore, discussion associated with the aforementioned other elements have been skipped for the sake of clarity and convenience.

In one or more embodiments, data processing device 100 may include a display unit 140 (e.g., a Liquid Crystal Display (LCD), a Cathode Ray Tube (CRT) monitor) associated therewith; display unit 140 also may be powered through battery 102. In one or more embodiments, output data associated with processing through processor 160 may be input to a multimedia processing unit (not shown) configured to perform encoding/decoding associated with the data. In one or more embodiments, the output of the multimedia processing unit may be rendered on display unit 140; FIG. 1 shows processor 160 being communicatively coupled to display unit 140. In one or more embodiments, a display screen area of display unit 140 may be illuminated through backlight 104.

In one or more embodiments, data processing device 100 may include a user interface 180 coupled to controller 110 in order to enable a user 190 of data processing device 100 to input options associated with cropping of a size of a display screen (e.g., display screen pixels) of display unit 140. In one or more embodiments, user 190 may not desire and/or require viewing of a number of applications executing on data processing device 100 on a large display screen area of display unit 140; the aforementioned utilization of the large display screen area may consume a lot of power, leading to reduced backup provided through battery 102. Exemplary embodiments discussed herein are directed to utilizing the display screen area on display unit 140 efficiently, i.e., effectively according to requirements of the applications executing on data processing device 100 and/or requirements of user 190.

FIG. 1 shows a number of applications $120_{1-N}$ (e.g., a camera application, radio, contacts and calling) executing on data processing device 100. For example, at most times, user 190 may unlock a mobile phone (an example data processing device 100) to merely check the time and/or the remaining battery (e.g., battery 102) time. By default, the complete display screen area on display unit 140 may be enabled, thereby consuming a lot of power from battery 102. Exemplary embodiments discussed herein provide user 190 a capability to crop the display screen area on display unit 140 as per needs and/or requirements thereof.

In one or more embodiments, user 190 may be provided the capability to crop the display screen area through user interface 180. In one or more embodiments, the aforementioned cropping may be initiated through a driver component (e.g., a software driver) associated with processor 160, operating system 172 and/or an application $120_{1-N}$. In one or more embodiments, the triggering of the custom display screen area cropping may be accomplished through user 190 inputting appropriate data through user interface 180, through user 190 clicking a physical button associated with data processing device 100 (e.g., external toggle button such as the volume button), user 190 clicking/touching settings options accessible through the display screen of data processing device 100 etc. Other forms of the triggering are within the scope of the exemplary embodiments discussed herein.

Figure 2:
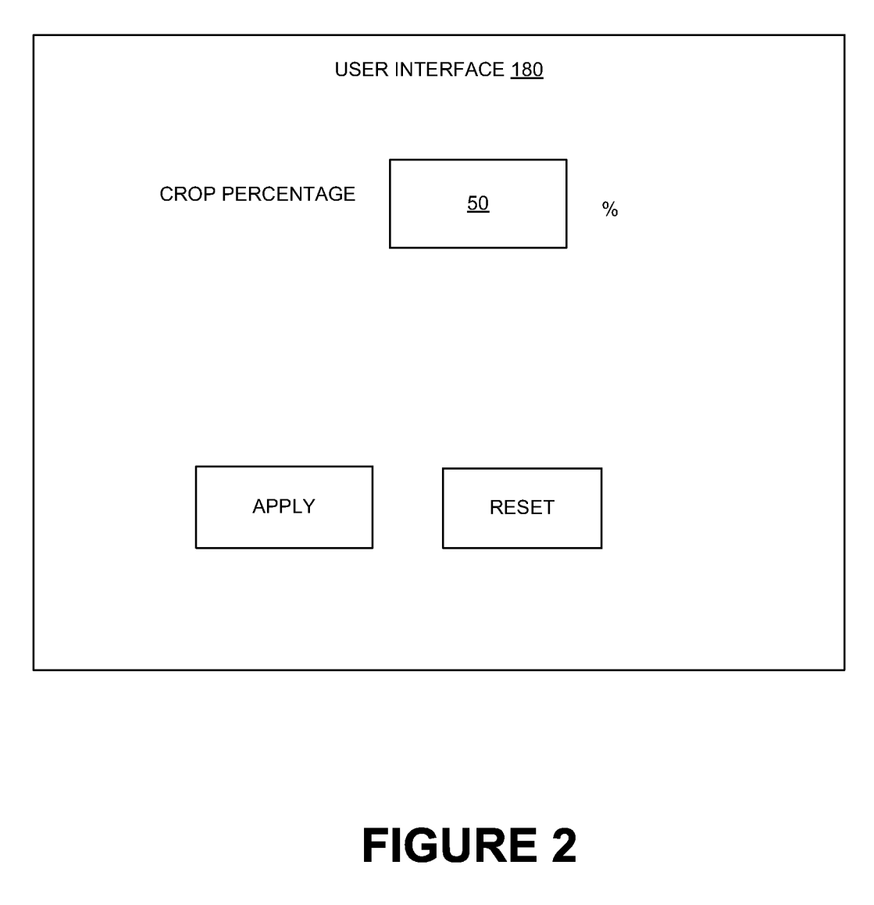
FIG. 2 is a schematic view of an example user interface of the data processing device of FIG. 1.
Figure 3:
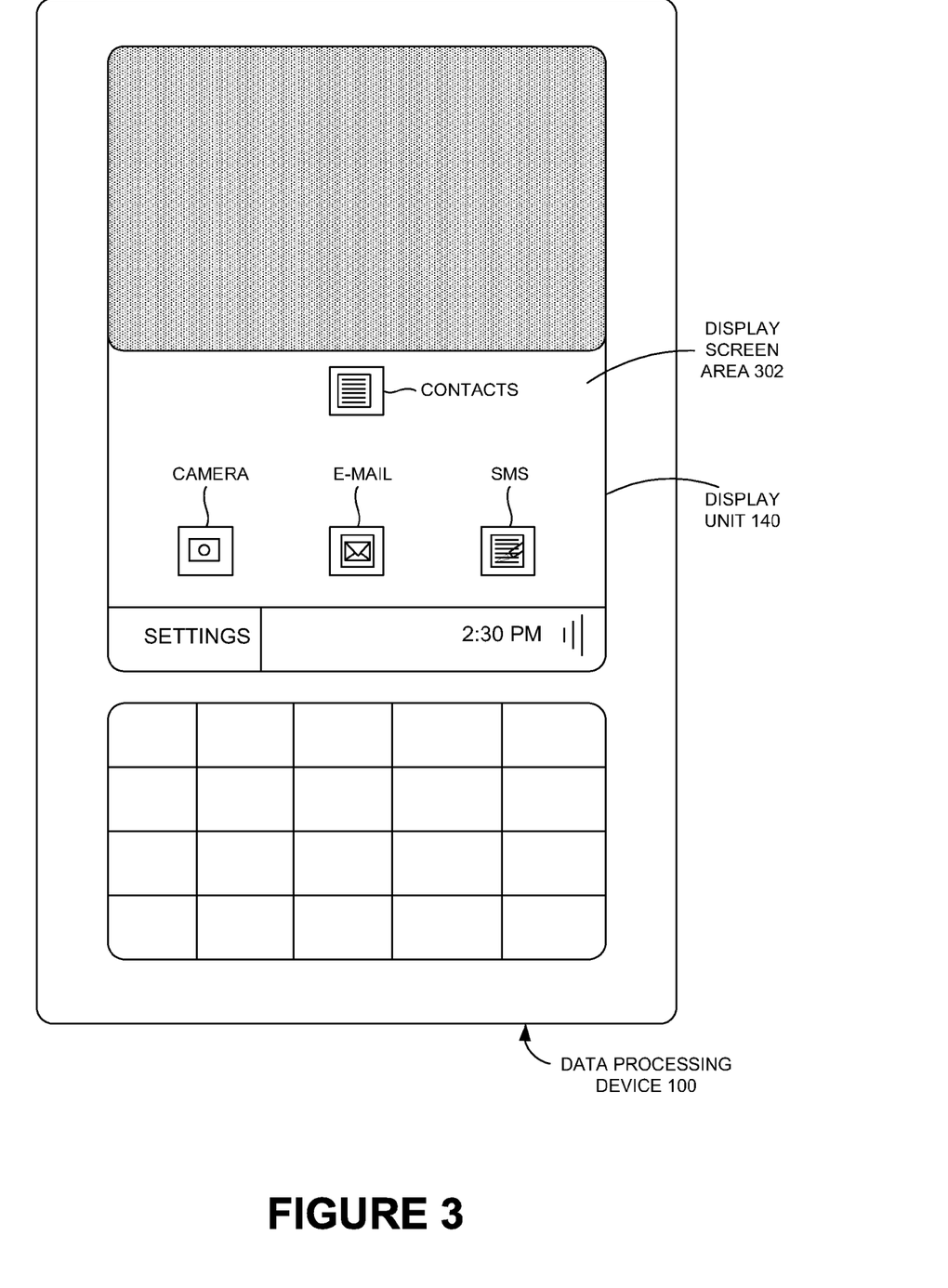
FIG. 3 is an illustrative view of utilization of merely 50% of a display screen area of a display unit of an example data processing device of FIG. 1.
Figure 4:
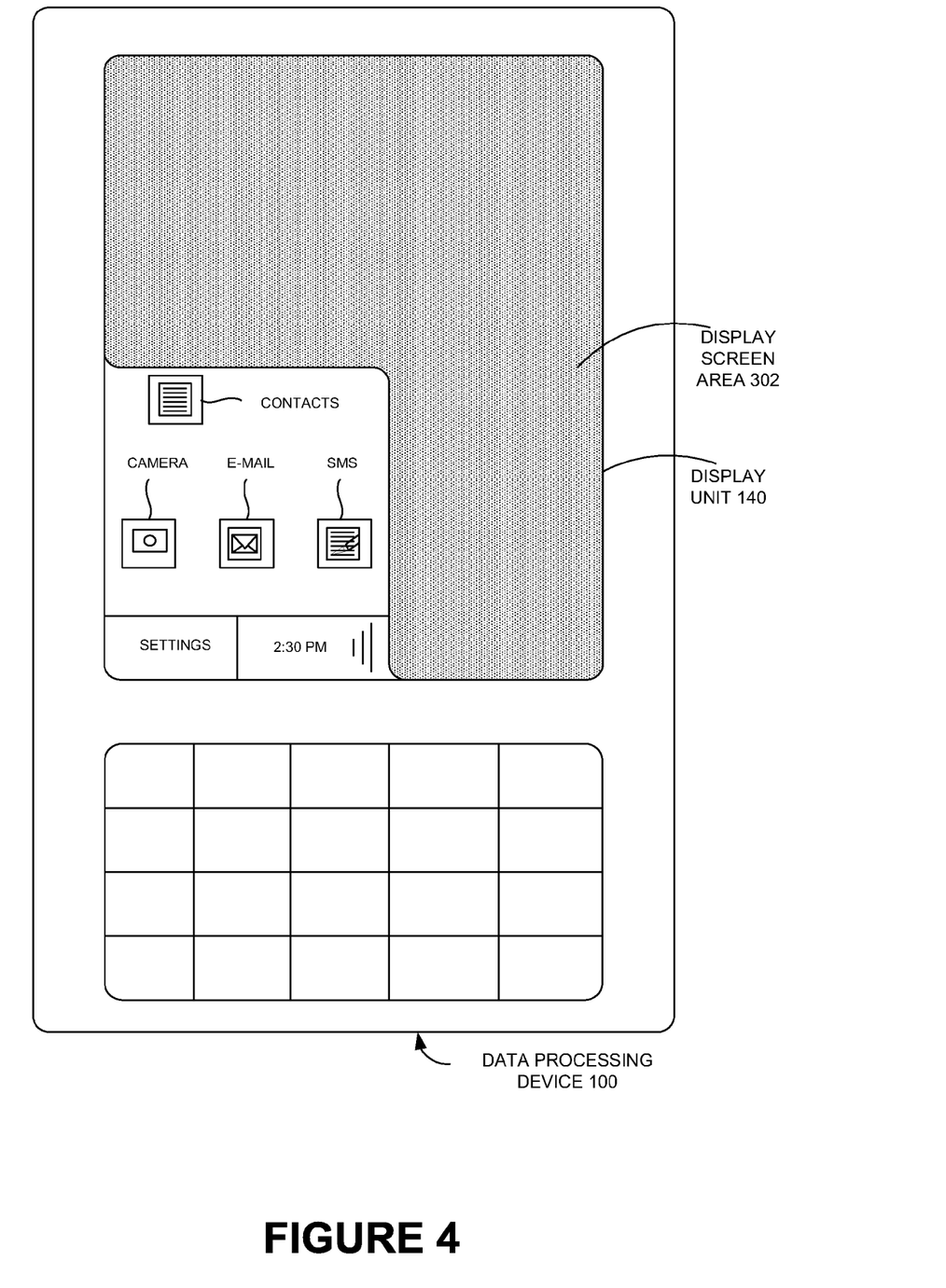
FIG. 4 is an illustrative view of utilization of merely 25% of the display screen area of the display unit of the example data processing device of FIG. 3.

FIG. 2 shows an example user interface 180. Here, user 190 may specify the percentage of display screen area of display unit 140 of data processing device 100 to be cropped. For example, user 190 may enter 50% in a box provided by user interface 180 to enable disabling of 50% of the display screen area. Variations in the data to be entered through user interface 180 are within the scope of the exemplary embodiments. FIG. 3 shows utilization of merely 50% of a display screen area 302 of display unit 140 of an example data processing device 100. FIG. 4 shows utilization of merely 25% of display screen area 302 of display unit 140 of the example data processing device 100.

In one or more embodiments, in addition to or instead of user 190 having a capability to input custom cropping options, user interface 180 may have a set of cropping profiles (not shown; e.g., accessible through a drop-down menu) from which user 190 chooses the cropping percentage.

Figure 5:
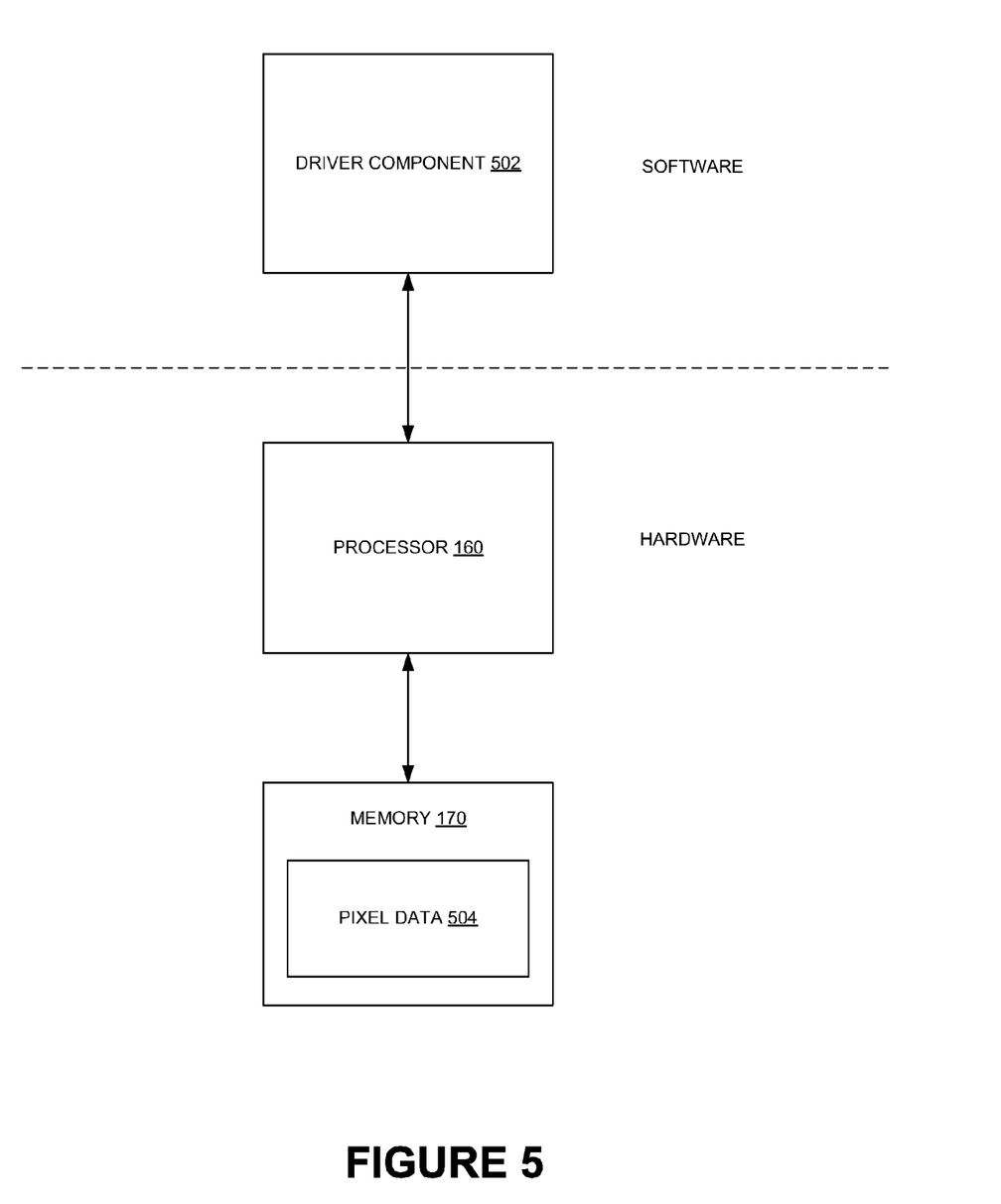
FIG. 5 is a schematic view of interaction between a driver component and a processor of the data processing device of FIG. 1 during cropping of a display screen area of a display unit thereof, according to one or more embodiments.

FIG. 5 shows interaction between a driver component 502 and processor 160 during cropping of display screen area 302 of display unit 140 of data processing device 100. In one or more embodiments, user 190 may initiate the aforementioned cropping through user interface 180 (or, through a physical button), as discussed above. Upon the initiation, an Application Programming Interface (API) of, say, a multimedia framework implemented in data processing device 100 may be exposed to driver component 502. In one or more embodiments, driver component 502 may cause processor 160 to scale down pixel data 504 (e.g., shown as being stored in memory 170) corresponding to display screen area 302 to an appropriate size, as dictated by the initiation of user 190. In one or more embodiments, following the scaling, processor 160 may render the scaled down pixel data on a specific portion of display screen area 302.

Figure 6:
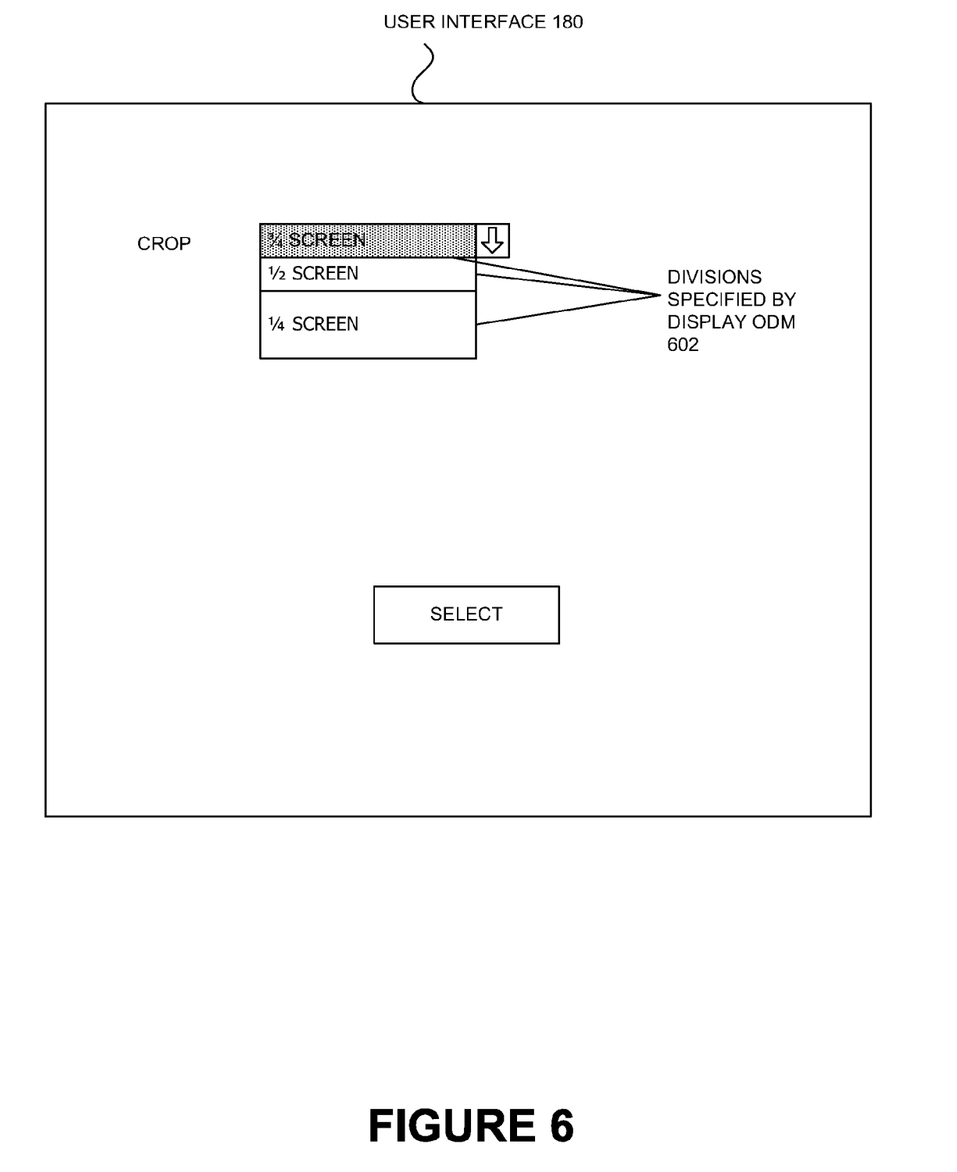
FIG. 6 is a schematic view of an alternate embodiment of cropping of the display screen area of the display unit of the data processing device of FIG. 1.
Figure 7:
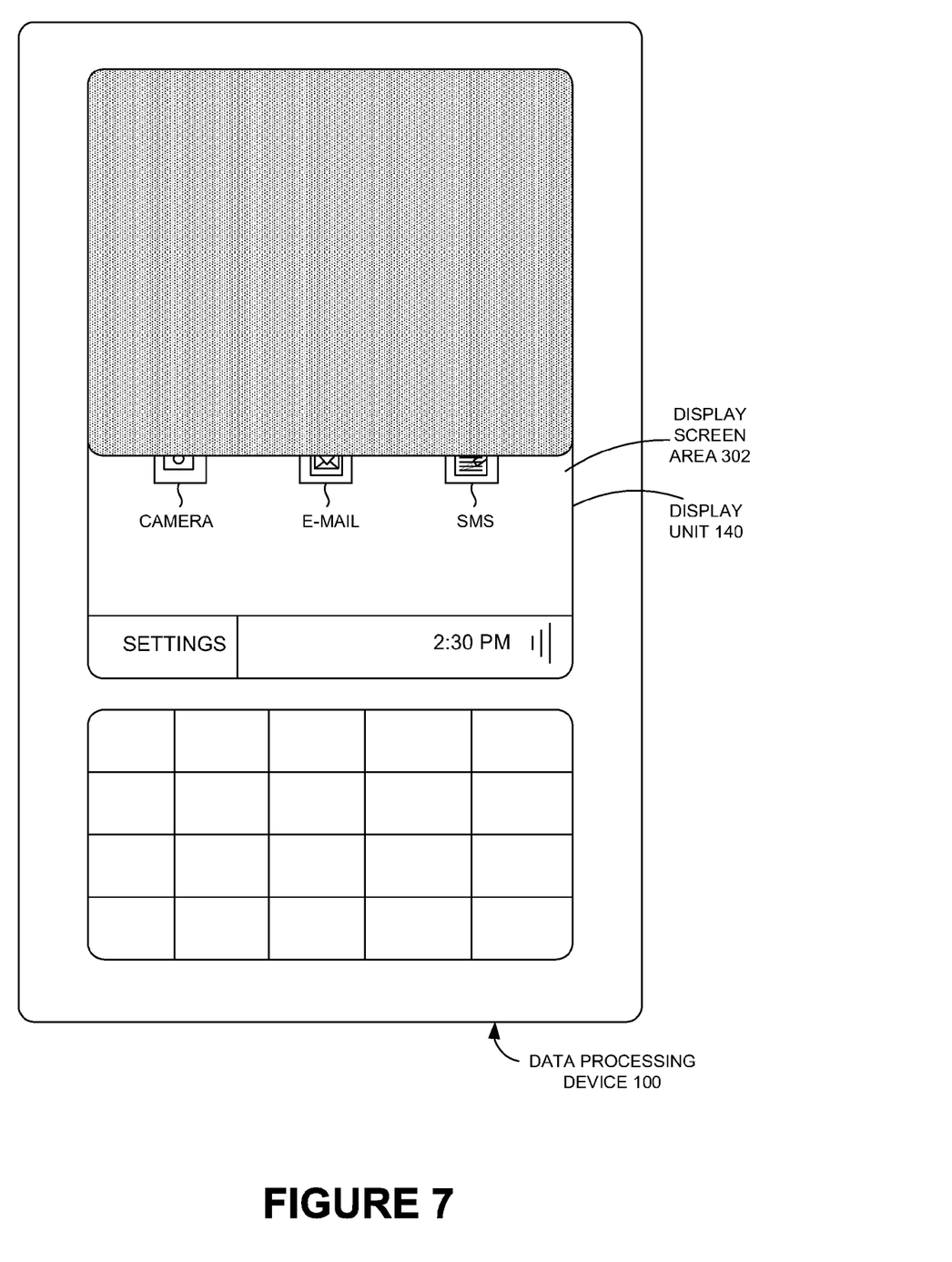
FIG. 7 is an illustrative view of an appropriate cropping of the display screen area of the display unit of the data processing device of FIG. 3 in an example scenario.

It is to be noted that rendering of the scaled down pixel data does not limit the scope of the exemplary embodiments. FIG. 6 shows an alternate embodiment of cropping display screen area 302. Here, a display Original Design Manufacturer (ODM) 602 (e.g., an ODM of display unit 140) may specify divisions of display screen area 302. User interface 180 may provide options based on the aforementioned specified divisions (e.g., through a drop-down menu therein). User 190 may be provided the capability to choose one of the options to cause display screen area 302 to be appropriately cropped. Here, it should be noted that pixel data 504 is not scaled down. An example scenario involving this would be when user 190 desires to view only the bottom portion of display screen area 302 of a mobile phone (an example data processing device 100) that shows the current time. FIG. 7 shows the appropriate cropping for the aforementioned example scenario. Here, portions of pixel data 504 not to be rendered on display screen area 302 may be ignored/discarded by processor 160.

In yet another example embodiment, driver component 502 may provide a capability for user 190 to define a custom mode of displaying pixel data 504 from processor 160 on display unit 140. In one or more embodiments, the custom mode may be interpretable through operating system 172. For example, user 190 may input reduced dimensions of display screen area 302 in the custom mode through user interface 180. The aforementioned input from user 190 may result in a cropped display screen area 302 with/without scaling of pixel data 504 discussed above.

Thus, exemplary embodiments discussed herein provide for reduced power utilization from battery 102 of data processing device 100. In scenarios where user 190 is unable to charge (e.g., during travel) data processing device 100 for long hours, user 190 may benefit through the cropping of display screen area 102 discussed above.

The driver component (e.g., driver component 502) discussed above or equivalent software thereof may be stored in memory 170 to be installed on data processing device 100 after a download through the Internet. Alternately, an external memory may be utilized therefor. Also, instructions associated with the driver component may be embodied on a non-transitory medium readable through data processing device 100 such as a Compact Disc (CD), a Digital Video Disc (DVD), a Blu-ray™ disc, a floppy disk, or a diskette etc. The aforementioned instructions may be executable through data processing device 100.

The set of instructions associated with the driver component or equivalent software thereof is not limited to specific embodiments discussed above, and may, for example, be implemented in operating system 172, an application program (e.g., application $120_{1-N}$), a foreground or a background process, a network stack or any combination thereof. Other variations are within the scope of the exemplary embodiments discussed herein.

Figure 8:
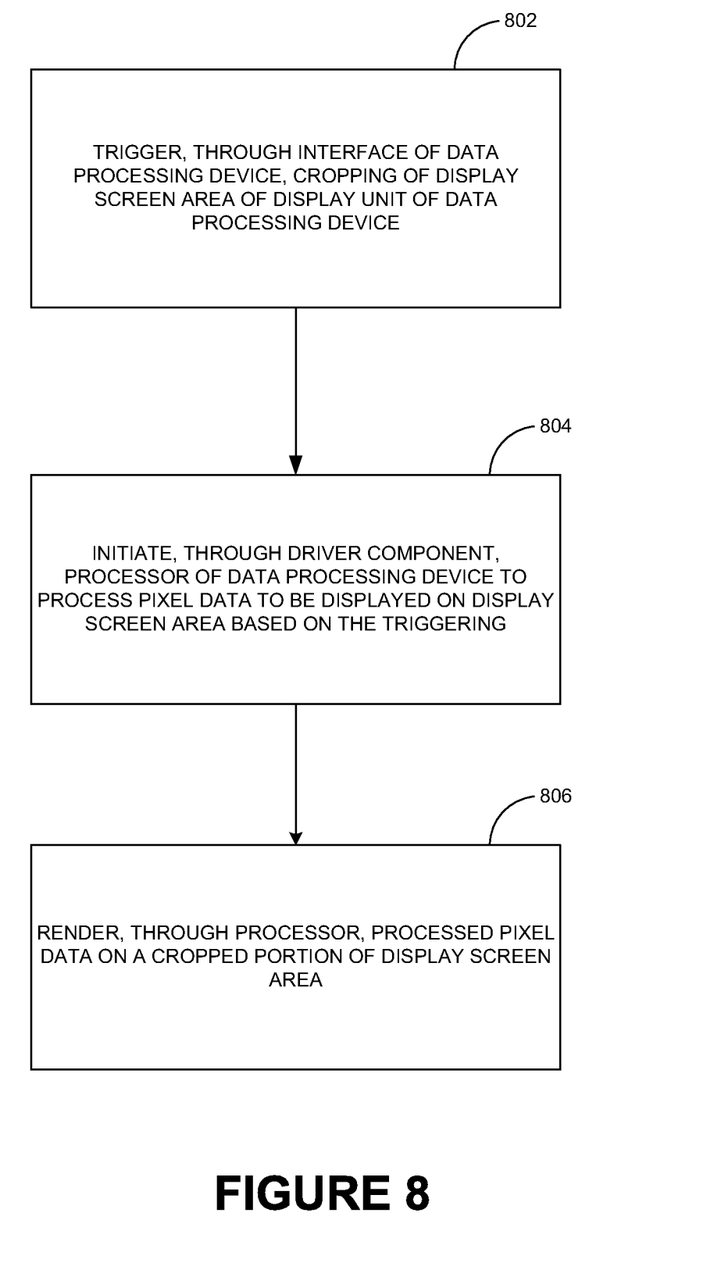
FIG. 8 is a process flow diagram detailing the operations involved in customized cropping of the display screen area of the display unit of the data processing device of FIG. 1, according to one or more embodiments.

FIG. 8 shows a process flow diagram detailing the operations involved in customized cropping of display screen area 302 of display unit 140 of data processing device 100, according to one or more embodiments. In one or more embodiments, operation 802 may involve triggering, through an interface (e.g., user interface 180) of data processing device 100, cropping of display screen area 302. In one or more embodiments, operation 804 may involve initiating, through driver component 502 associated with processor 160, operating system 172 and/or an application (e.g., application $120_{1-N}$) executing on data processing device 100, processor 160 to process pixel data 504 to be displayed on display screen area 302 based on the triggering. In one or more embodiments, operation 806 may then involve rendering, through processor 160, the processed pixel data 504 on a cropped portion of display screen area 302.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

What is claimed is:

1. A method comprising:
triggering, through an interface of a data processing device, cropping of a display screen area of a display unit of the data processing device, wherein cropping of the display screen area comprises enabling a first portion of the display screen area and disabling a second portion of the display screen area;
initiating, through a driver component associated with an operating system executing on the data processing device the processor to process pixel data to be displayed on the first portion of the display screen area based on the triggering; and
rendering, through the processor, the processed pixel data on the first portion of the display screen area of the display unit.

2. The method of claim 1, wherein the processing of the pixel data comprises scaling, through the processor, the pixel data in accordance with the triggering.

3. The method of claim 1, wherein triggering, through the interface, cropping of the display screen area further comprises:
providing, through the driver component, a capability to define a custom mode of displaying the pixel data on the first portion of the display screen area through the interface, the custom mode being interpretable through the operating system; and
receiving, as an input in the custom mode through the interface, dimensions of the first portion of the display screen area in which the pixel data is to be rendered.

4. The method of claim 1, wherein the interface is at least one of a clickable interface accessible through a display screen of the display unit, a touchable interface accessible through the display screen and a physical button of the data processing device.

5. The method of claim 1, wherein at least one of:
the processor is one of a Central Processing Unit (CPU) and a Graphics Processing Unit (GPU), and
the memory is at least one of a volatile memory and a non-volatile memory.

6. The method of claim 1, further comprising choosing one of a set of cropping profiles accessible through the interface to trigger the cropping of the display screen area.

7. The method of claim 1, further comprising:
specifying divisions of the display screen area through an Original Design Manufacturer (ODM) of the display unit; and
choosing one of the specified divisions of the display screen area through the interface to trigger the cropping thereof.

8. A non-transitory medium, readable through a data processing device and including instructions embodied therein that are executable through the data processing device, comprising:
instructions to enable triggering, through an interface of the data processing device, cropping of a display screen area of a display unit of the data processing device, wherein cropping of the display screen area comprises enabling a first portion of the display screen area and disabling a second portion of the display screen area;

instructions to initiate, through a driver component associated with an operating system executing on the data processing device the processor to process pixel data to be displayed on the first portion of the display screen area based on the triggering; and instructions to render, through the processor, the processed pixel data on the first portion of the display screen area of the display unit.

9. The non-transitory medium of claim 8, wherein instructions to initiate the processing of the pixel data comprises instructions to scale, through the processor, the pixel data in accordance with the triggering.

10. The non-transitory medium of claim 8, wherein instructions to enable triggering, through the interface, cropping of the display screen area further comprises:

instructions to provide, through the driver component, a capability to define a custom mode of displaying the pixel data on the first portion of the display screen area through the interface, the custom mode being interpretable through the operating system; and instructions to receive, as an input in the custom mode through the interface, dimensions of the first portion of the display screen area in which the pixel data is to be rendered.

11. The non-transitory medium of claim 8, comprising instructions compatible with the interface being at least one of a clickable interface accessible through a display screen of the display unit, a touchable interface accessible through the display screen and a physical button of the data processing device.

12. The non-transitory medium of claim 8, further comprising instructions to choose one of a set of cropping profiles accessible through the interface to trigger the cropping of the display screen area.

13. The non-transitory medium of claim 8, further comprising:

instructions to specify divisions of the display screen area through an ODM of the display unit; and instructions to choose one of the specified divisions of the display screen area through the interface to trigger the cropping thereof.

14. A data processing device comprising:
a memory;
a processor communicatively coupled to the memory;
a display unit;
an interface configured to enable triggering of cropping of a display screen area of the display unit, wherein cropping of the display screen area comprises enabling a first portion of the display screen area and disabling a second portion of the display screen area; and
a driver component associated with an operating system executing on the data processing device the driver component being configured to initiate the processor to process pixel data to be displayed on the display screen area based on the triggering through the interface, and the processor further being configured to render the processed pixel data on the first portion of the display screen area of the display unit.

15. The data processing device of claim 14, wherein the processor is configured to scale the pixel data in accordance with the triggering.

16. The data processing device of claim 14, wherein the driver component is configured to provide a capability to define a custom mode of displaying the pixel data on the first portion of the display screen area through the interface, the custom mode being interpretable through the operating system, and wherein dimensions of the first portion of the display screen area in which the pixel data is to be rendered are configured to be received as an input in the custom mode through the interface.

17. The data processing device of claim 14, wherein the interface is at least one of a clickable interface accessible through a display screen of the display unit, a touchable interface accessible through the display screen and a physical button of the data processing device.

18. The data processing device of claim 14, wherein at least one of:

the processor is one of a CPU and a GPU, and
the memory is at least one of a volatile memory and a non-volatile memory.

19. The data processing device of claim 14, wherein the interface provides a set of cropping profiles, out of which one is configured to be chosen to trigger the cropping of the display screen area.

20. The data processing device of claim 14, wherein an ODM of the display unit is configured to specify divisions of the display screen area, and wherein the interface provides the specified divisions, out of which one is configured to be chosen to trigger the cropping of the display screen area.

* * * * *